United States Patent [19]
Watabe et al.

[11] Patent Number: 6,035,667
[45] Date of Patent: *Mar. 14, 2000

[54] METHOD OF MAKING GLASS YARN WITH CONTROLLED TENSION

[75] Inventors: Kenzo Watabe; Michio Kurokata, both of Koriyama, Japan

[73] Assignee: Nitto Glass Fiber Mfg. Co., Ltd., Fukushima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/768,866

[22] Filed: Dec. 17, 1996

Related U.S. Application Data

[60] Continuation of application No. 08/402,613, Mar. 13, 1995, which is a division of application No. 08/027,042, Mar. 5, 1993, abandoned.

[30] Foreign Application Priority Data

Mar. 16, 1992 [JP] Japan .................................. 4-058187

[51] Int. Cl.⁷ .................................................. C03B 37/07
[52] U.S. Cl. ........................... 65/381; 65/479; 242/154; 242/419.7
[58] Field of Search ..................... 63/381, 479; 242/153, 242/154, 419.7

[56] References Cited

U.S. PATENT DOCUMENTS

| | | |
|---|---|---|
| 2,754,071 | 7/1956 | Fürst ...................................... 242/154 |
| 2,935,179 | 5/1960 | Brautigam et al. . |
| 3,300,161 | 1/1967 | Hermanns ............................... 242/154 |
| 3,361,375 | 1/1968 | Klink ..................................... 242/153 |
| 3,369,587 | 2/1968 | Klink et al. . |
| 3,371,877 | 3/1968 | Klink et al. . |
| 3,523,650 | 8/1970 | Klink et al. . |
| 3,718,448 | 2/1973 | Drummond .............................. 65/453 |
| 3,808,789 | 5/1974 | Hurley . |
| 3,847,579 | 11/1974 | Fulk et al. . |
| 3,876,404 | 4/1975 | Drummond .............................. 65/453 |
| 3,966,133 | 6/1976 | Gelin ................................... 242/419.7 |
| 3,997,308 | 12/1976 | Drummond et al. . |
| 4,045,195 | 8/1977 | Drummond .............................. 65/479 |
| 4,130,248 | 12/1978 | Hendrix ............................... 242/18 G |

FOREIGN PATENT DOCUMENTS

| | | |
|---|---|---|
| 0 299 506 A1 | 7/1988 | European Pat. Off. . |
| 37 02 702 A1 | 1/1987 | Germany . |
| 41 29 028 A1 | 8/1991 | Germany . |
| 504714 | 2/1976 | U.S.S.R. .................................. 65/453 |

OTHER PUBLICATIONS

The Manufacturing Technology of Continuous Glass Fibres, K.L. Loewenstein, B.Sc., Ph.D., F.S.G.T., Amsterdam–Oxford–New York, 1983, pp. 20–21 and 30–31.

*Primary Examiner*—John Hoffmann
*Attorney, Agent, or Firm*—Darby & Darby

[57] ABSTRACT

When one strand, which is formed by gathering a multiplicity of glass filaments having a diameter of $9\mu$ or less and formed by drawing molten glass flowed out through a multiplicity of orifices formed in the bottom portion of a bushing, is wound around a collet, the strand is wound to form a square-end cheese package by traversing the strand by a traversing device having a constant amplitude, while the strand is brought into contact with a rotative drum of a tension relaxing device to reduce the tension acting on the strand. Thus, the quality of a package of non-twisted glass yarn having a monofilament diameter of 3 to $9\mu$ can be improved, a large quantity of the package can be formed, and the package can easily be transported.

5 Claims, 4 Drawing Sheets

METHOD OF MAKING GLASS YARN WITH CONTROLLED TENSION

This is a continuation of application Ser. No. 08/402,613, filed Mar. 13, 1995, which is a divisional of application Ser. No. 08/027,042, filed Mar. 5, 1993 now abandoned.

BACKGROUND OF THE INVENTION

1. Field of the Invention

The present invention relates to a glass yarn having a filament diameter of 3 to 9μ, and more particularly to a glass yarn wound into a form of a square-end cheese package and a method of and an apparatus for manufacturing the same.

2. Description of the Prior Art

As well known, glass fiber is formed into hundreds of filaments by drawing, at high speed, molten glass flowed out through hundreds of orifices formed in the bottom of a bushing. Then, sizing agent is applied to the filaments followed by gathering the filaments into one strand. The strand is wound by a winding apparatus while traversing the strand by a traversing device, so that the strand is temporarily formed into a cake (see FIGS. 3A and 3B). At the time of use, the glass fiber is unwound from the cake to be used in either of two methods categorized as follows: the first method is a method in which a winding tube is removed after the cake has been heated and dried for a predetermined time, and the strand is drawn out from the inside of the cake (generally aforesaid method is called an "inside drawing method). Then, a predetermined number (usually 10 to 30) of the strands are paralleled to be wound up by a winder so that a glass roving is formed. As an alternative to this, the strands are supplied to a cutter to be formed into chopped strands which will be used as reinforcing materials for FRP or FRTP. In another method, the cake is dried naturally for a predetermined time, and the cake is set on a rewinder. The strand is drawn out from the outer portion of the cake while rotating the cake (in general the aforesaid method is called an "outside drawing method) so as to be twisted. As a result, a glass yarn is formed and the glass yarn is wound around a bobbin so as to be used in glass fiber texture.

The cake is formed into a barrel-like shape, the central portion of which projects outwardly as shown in FIG. 3A, because the strand is wound as described above while being traversed with an amplitude as shown in FIG. 3A in such a manner that the traversing device is also reciprocated within a stroke b. However, the degree of the projection over the central portion of the cake undesirably increases in proportion to the quantity of the wound strand. If the central portion of the cake projects excessively, the speed of the strand is always changed when the strand is wound while being traversed because the peripheral speed varies depending upon the position in the cake. The aforesaid speed change causes the speed of drawing the molten glass at the high speed to be changed. It leads to a fact that the size of the strand is undesirably changed. Therefore, a glass yarn composed of strands exhibiting an equal yarn count cannot be manufactured. If the degree of the projection is enlarged for the purpose of enlarging the quantity of the cake formed by winding the strands, the size of the strand cannot be included in a predetermined range. Therefore, the strand cannot be wound to form the projection of the cake that is larger than a certain degree. As a result, the inner diameter of the cake tends to be enlarged in order to enlarge the quantity of the cake formed by winding the strand, resulting in an excessively large size of the cake. Furthermore, the aforesaid large cake is formed into a thin shape. What is worse, the two terminative ends of the cake are formed into excessively thin and sharpened shape. Therefore, the cake cannot easily be handled. It is very difficult for a user to handle the cake as it is, and the cake cannot easily be packaged up for transportation. Even if the cake can be packaged up, the size of the package becomes too large with respect to the quantity which can be transported, causing a problem of unsatisfactory transportation efficiency. As a result, there arises an economical problem in terms of practical use if the strand wound into the cake is made to be a product as it is. Therefore, the aforesaid post-process must be performed.

In the case of the glass yarn, the strand is rewound from the cake to be formed into a yarn package while being twisted to be a predetermined degree as described above. A rewinding twister to be used in the aforesaid process has a creel on which a cake having a winding tube can be mounted. The strand is drawn out from the outer portion of the cake mounted on the delivery creel followed by twisting the strand by an ordinary twisting mechanism. Then, the strand is wound to be formed into the yarn package.

Methods of delivering the strand from the creel are categorized into a method in which the creel is drivingly rotated, and a method in which the rotation of the creel is made free to draw out the strand at a predetermined speed. It is considered to employ the rotation driving method to deliver the strand in order to prevent generation of fluff. If the thickness of the cake formed by winding the strand is large, the number of twist in the inner layer and that in the outer layer are therefore different from each other. As a result, a problem arises in a post-process such as the doubling and twisting process and the weaving process. The aforesaid fact has been one of the reasons that the thickness of the cake for the glass yarn cannot be enlarged considerably.

Furthermore, the glass yarn is different from the glass roving in a necessity of having a satisfactory constant-length rate. Since glass yarns shorter than a predetermined length or glass yarns that have adhesive portion cause the yield in the following process or the quality of the product to deteriorate, such glass yarns cannot be used freely. Since the roving is used in the form of glass roving manufactured by paralleling 10 to 30 strands or in the form of chopped strands obtained by cutting the strand to have a predetermined length, the constant-length rate is not the critical factor.

The constant-length rate of the glass yarn depends upon the cut ratio during the time of the spinning process and the cut ratio during the time of the rewinding process. The cut ratio per cake rises in proportion to the length of the glass yarn wound to form the cake. On the other hand, the constant-length rate is lowered in inverse proportion to the length of the wound glass yarn. Hence, the quantity of the wound glass yarn is ordinarily made to be 8 kg in the case of ECG75 (400 filaments of 9μ having a tex count of 67.5) and 3.5 kg (200 filaments of 7μ having a tex count of 22.5).

Tension (per tex count) acting on the strand at the time of the spinning process increases in inverse proportion to the diameter of the filament if the residual conditions for the glass fiber are the same. Therefore, the glass yarn is applied with a large spinning tension per tex because the glass yarn has a smaller filament diameter than the roving. The enlargement of the spinning tension for the glass yarn is in inverse proportion to the diameter of the filament. If the quantity of winding to form the cake is enlarged, the large spinning tension causes a problem of the quality of the thread in the inner layer to arise because the pressure of winding acting on the inner layer of the cake is enlarged. That is, the thread in the inner layer easily encounters cracks and easily generates fluff. For example, a glass yarn having a filament diameter of 3μ and known as a beta-yarn cannot be substantially used due to deterioration of the threads in the inner layer thereof if the quantity of the cake is made to be 2 kg or more. Because of the aforesaid reasons, it has been considered that the quantity of the wound glass yarn is limited to about 150,000 m under excellent conditions although it depends upon the filament diameter and the number of filaments.

The glass yarn has been used in a variety of ways and therefore the glass yarn must meet various requirements. For example, there arise a desire for a non-twisted glass yarn recently although the glass yarn has been considered to have a predetermined twist.

In the glass yarn wound to form the cake shape, the strand wound at a terminative end portion of the cake and the strand wound at the central portion are different from each other in the yarn count. Therefore, the yarn count varies in one strand in accordance with the period of the traverse. The aforesaid phenomenon becomes excessively in proportion to the quantity of the cake. Although it is preferable that the quantity of the wound glass yarn be large in terms of the control in the following process, the quantity of winding is limited because the dispersion of the yarn counts must be prevented.

Since the cake is formed into a shape having two thin ends pointed as shown in FIG. 3A, it cannot easily be handled. If the end portion is damaged, the strand can be cut at the damaged portion when the strand is drawn out from the cake. Therefore, it is very difficult to transport and package the cake.

Recently, there has been a desire for a non-twisted glass yarn. Although the barrel-like shape is very suitable to winding the strand to form the cake and rewinding the same by the rewinding twister while twisting it, it is not suitable to rewind the strand while omitting twisting.

If the strand is wound up while placing the cake stationarily in such a manner that substantially no twist is given, for example if the strand is intended to be drawn out from the inside of the cake placed horizontally, an adjacent strand is undesirably drawn out together with the desired strand. That is, a so-called scramble drawing phenomenon takes place and therefore the strand cannot be drawn out as desired. The reason for this is that a wire traverse method for traversing the cake for the glass yarn cannot accurately control the traversing angle. Another reason is that the employed starch type sizing agent, which is dried by air, cannot retain the shape of the cake. Therefore, the strand can easily be separated from other strands if a small impact is applied.

If the strand is intended to be drawn out from the cake placed vertically, the lower end portion is undesirably bent and deformed by the weight of-the cake because the end portion of the cake is thinned and pointed. As a result, the strand which is being drawn out can be caught and cut at this position. If the cake including the winding tube is placed vertically, the strand which is being drawn out comes in contact with and rubs the central portion in which the strands are wound densely in the case where the strand is drawn out from the lower portion of the cake because the central portion of the cake has a large thickness and the thickness decreases toward the two ends. As a result, fluff easily takes place, causing the strand to finally be cut. As described above, it is difficult to obtain non-twisted glass yarn from the glass yarn wound to form the cake shape. What is worst, the conventional glass yarn has a limitation in the quantity of winding and the length of winding. Therefore, there arises a problem that a requirement to enlarge the quantity of winding made from the following process cannot be met. The enlargement of the quantity of winding has been become important because the glass yarn has been used widely as well as the conventional requirement made by the following glass yarn process.

SUMMARY OF THE INVENTION

The inventor of the present invention has, as a result of a variety of investigations, found a fact that the aforesaid problems can be overcome by forming the shape of the strand package for use in the spinning process into a square-end cheese package in place of the conventional barrel-like cake, the forming of the square-end cheese package. That is, it has been found that the aforesaid problems can be overcome by employing a glass yarn, the monofilament diameter of which is 3 to 9μ, to which sizing agents are applied, which is not twisted and which is wound to form a square-end cheese package. The "9μ" filament is, in the glass fiber industrial field, a filament that has an average diameter of 9.1 to 9.2μ.

A fact was found that the square-end cheese package can be formed by using a tension relaxing device below the gathering roller at the time of spinning the glass yarn. That is, the square-end cheese package can be formed by the following process: a multiplicity of 3 to 9μ glass filaments are formed by drawing molten glass discharged through a multiplicity of orifices formed in the bottom portion of a bushing; sizing agent is applied to a multiplicity of the glass filaments; one strand is formed by a gathering device; the one strand is brought into contact with at least one rotative drum of a tension relaxing device; the strand is wound around a winding tube fastened to a collet while being traversed by a traversing device having a predetermined amplitude; and the strand is formed into a square-end cheese package.

Hitherto, there has been a product formed into a square-end cheese package which has been in the case of some types of a glass roving having a filament diameter larger than 10μ. The aforesaid arrangement can be realized by the advancement of the spinning technology which enabled one bushing to form 2000 to 4000 filaments. Therefore, one spinning strand can be used as a roving as it is. Hitherto, the glass roving has been formed by paralleling and winding 10 to 30 robing strands to form a square-end cheese package. In general, the former robing is called a "direct robing", while the latter robing is called a "bundled robing". Since an advantage that the quantity of production per bushing can be enlarged and an advantage that the manufacturing process can be decreased can be obtained, the direct robing has been, in place of the bundled robing, employed in the filament winding field and the pultrusion field. An ordinary direct robing has an arrangement that the filament diameter is a large value of 13 to 20μ and the tex count is 1000 to 3000 tex, that is, not only each filament has a large diameter but also the strand has a large size. Therefore, assuming that the quantity of the package formed by winding is 16 kg, the length of winding is 8,000 m if the yarn count of the strand is 2000 tex. As described above, the quantity of winding is relatively small.

On the other hand, the glass yarn has a very small filament diameter of 3 to 9μ and a small strand yarn count of 3 to 140 tex which are very thin as compared with the direct robing.

Therefore, in the glass fiber industrial field, the glass yarn has been different from the glass robing in the fact that there is no idea of winding the glass yarn to form a square-end cheese package.

As a result of a study made energetically, the inventor of the present invention has found a fact that the strand must be wound to form the square-end cheese package to overcome the foregoing problems. Furthermore, the inventor found that a glass yarn can be obtained with which the thread in the inner layer is not deformed by the pressure and has quality substantially same as that of the thread in the outer layer by employing spinning conditions capable of winding the glass yarn to form the square-end cheese package.

If a glass yarn having a diameter of $9\mu$ or less is wound to form a square-end cheese package, the thread in the intermediate layer is forcibly discharged as shown in FIG. 5 because the glass yarn has a large spinning tension. The size 5a shown in FIG. 5 increases in inverse proportion to the filament diameter and in proportion to the quantity of winding. If the glass yarn is wound to form a cake, the force for deforming the cake acts on the central portion of the cake. Therefore, the glass yarn is able to bear the aforesaid force. However, the friction coefficient of the glass yarn is made small in order to improve the facility of performing the following manufacturing process. Therefore, the thread easily slips and the end portion easily projects if it is wound to form the square-end. Since the quality of the thread of the projecting portion excessively deteriorates, the square-end cheese package of this type cannot be used as a product.

The most important factor for deforming the square-end cheese package is the relationship between the tension of the strand to be wound to form the package and the size of the strand. On the contrary, a factor for preventing the deformation is the angle of the strand to be wound on the package, that is, the degree of the traversing angle. If the traversing angle is the same, the degree of the deformation depends upon tension/size. If the tension is halved, the degree of the deformation is the same in the case where the size is the half. If the size of the strand and the tension are the same, the degree of the deformation of the package is the same between two cases, that is between a case in which the speed of the strand, that is, the speed at which the strand is wound is 3000 m/min and a case in which the speed is 1500 m/min, which are ordinary strand speeds in manufacturing glass fiber. That is, the degree of the deformation depends upon the force of per volume applied from the strand wound to form the package. An example of the tension realized when the glass filament diameter is $9\mu$ or less will now be described. Although the tension varies considerably depending upon the viscosity of the glass, the shape of the bushing orifice, the speed at which the strand is drawn out, the following tensions are realized if the speed is 3000 m/min and the size of the strand is 33.7 tex (g/1000 m): 170 gf when the glass filament diameter is $9.2\mu$ (200 filaments); 190 gf when the glass filament diameter is $7.5\mu$ (300 filaments); 215 gf when the glass filament diameter is $6.5\mu$ (400 filaments); 320 gf when the glass filament diameter is $5.3\mu$ (600 filaments); and 490 gf when the glass filament diameter is $3.7\mu$ (1200 filaments). As described above, the tension per the same strand size rapidly increases in inverse proportion to the diameter of the glass filament.

In the case where the size of the strand is 33.7 tex and the traversing angle is 4.5°, the tension must be reduced to 150 gf or lower regardless of the strand speed to easily form the square-end cheese package while maintaining the desired shape. If the traversing angle is decreased to 3°, the tension must be reduced to 100 gf to easily wind the strand. As described above, the target value of the tension of the strand which can be wound depends upon the traversing angle. Although the traversing angle acts to prevent the deformation of the package, the necessity of enlarging the traversing angle to prevent the deformation can be eliminated by further lowering the tension. Therefore, winding of the strand to form the square-end cheese package can be facilitated by reducing the tension.

The tension relaxing device comprises at least one rotative drum. The peripheral speed of the drum is made to be faster than the speed at which the strand is being wound to form the package. Furthermore, the strand is brought into contact with at least one drum. If the tension relaxing device is omitted, the strand is pulled by the rotational force of the package to draw the molten glass. Therefore, the tension generated at the time of drawing the molten glass acts, as the tension of the strand, on the surface of the package. By sharing the force for drawing the molten glass to the drum of the tension relaxing device, the strand freed from tension can be supplied to the package. Therefore, square-end cheese package revealing excellent shape can be formed.

By winding the strand into a predetermined shape while maintaining the square-end cheese package, an ordinary process for manufacturing a product by rewinding the glass yarn to a bobbin can be omitted. Therefore, the strand can be wound to form a package by a quantity larger than a limit quantity for a cake. As a result, the manufacturing yield can be improved. Furthermore, excellent quantity glass fiber, the yarn count of which is not substantially change and which is freed from twist, can be manufactured.

DESCRIPTION OF THE PREFERRED EMBODIMENT

Figure 1:
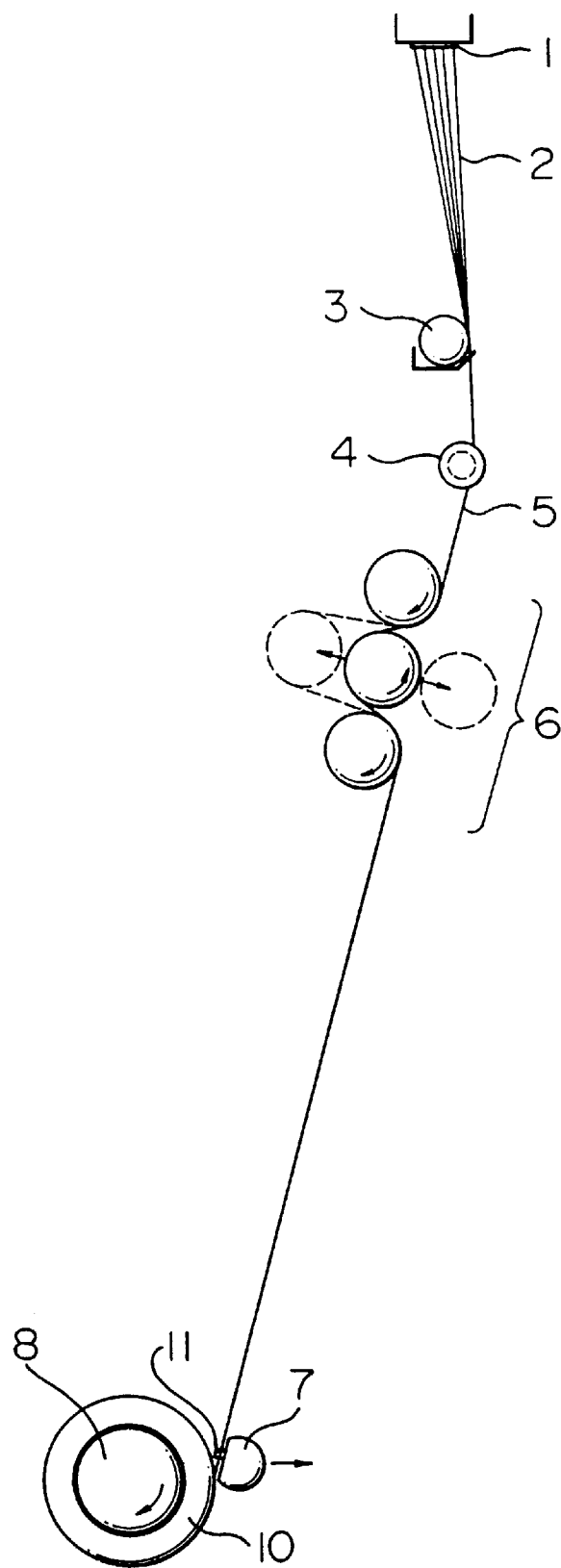
FIG. 1 is a side elevational view which illustrates an embodiment of an apparatus adapted to a method of manufacturing a glass yarn according to the present invention.
Figure 2:
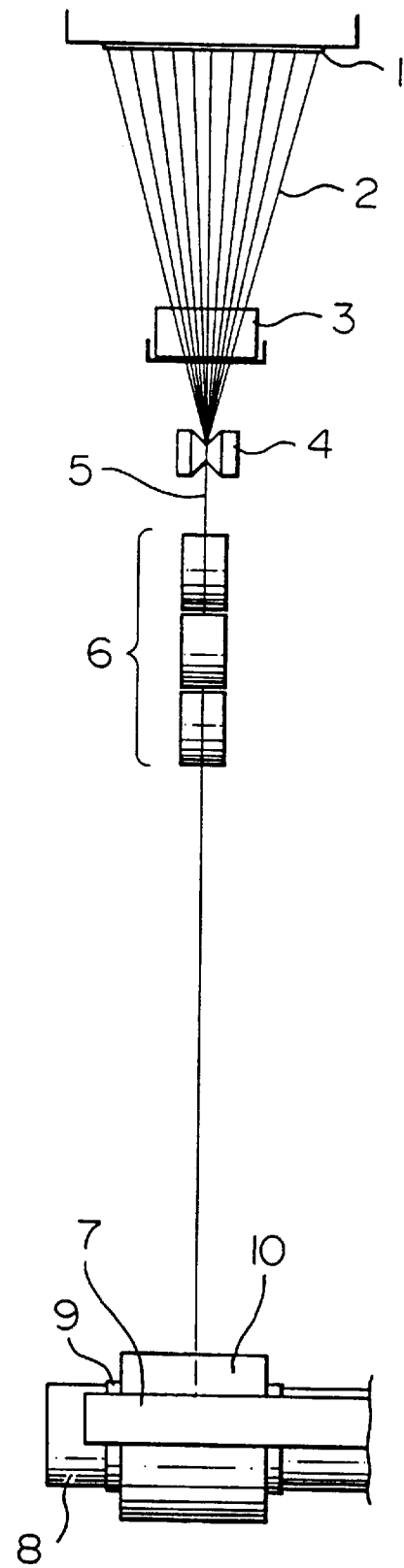
FIG. 2 is a front elevational view which illustrates the embodiment shown in FIG. 1.
Figure 3A:
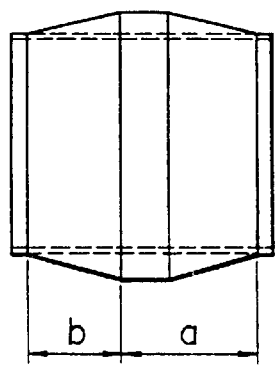
FIG. 3A is a front elevational view which illustrates a cake formed by a conventional winding method.
Figure 3B:
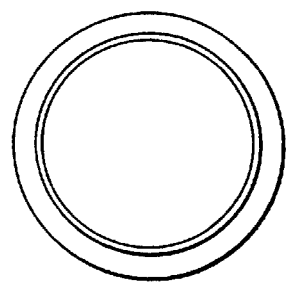
FIG. 3B is a side elevational view which illustrates the cake shown in FIG. 3A.

FIGS. 1 and 2 respectively are a side elevational view and a front elevational view which illustrate an embodiment of an apparatus according to the pre sent invention for forming a strand having a glass filament diameter of $9\mu$ or less into a square-end cheese package. A multiplicity of filaments 2 are drawn through a multiplicity of orifices formed in the bottom surface of a multi-hole bushing 1. The filaments 2 are applied with sizing agent by a sizing agent applicator 3, are gathered by a gathering device 4 to form one strand 5. The strand 5 is supplied to a tension relaxing device 6, and is brought into contact with at least one drum of the tension relaxing device 6 before it is conveyed. According to this embodiment the tension relaxing device 6 is composed of three drums arranged in such a manner that the second drum is shifted freely. As a result, force for pulling the strand can be varied arbitrarily. It should be understood that the present invention can be realized by using at least one drum. The reason is that even if only one drum is used, the force for pulling the strand can be generated by enlarging the angle at which the strand is brought into contact with the drum or by winding the strand around the drum one or more times. The strand 5 delivered from the tension relaxing device 6 is traversed by a traversing device 7 having a predetermined amplitude. Then, the strand 5 is wound around a winding tube 9 inserted onto a winding collet 8. As a result, the strand 5 is formed into a square-end cheese package 10.

The tension relaxing device 6 shown in FIGS. 1 and 2 comprises three drums each of which is rotated at a certain speed higher than the speed of the strand 5. The three drums can be individually set to determine speeds. Furthermore, the lateral position of the second drum can be freely shifted with respect to the upper and the lower drums. As a result, the force for pressing the strand 5 against the drums can be controlled so that the tension of the strand 5 to be delivered from the tension relaxing device 6 can be arbitrarily controlled. The traversing device 7 is a device having a chip 11 for holding the strand 5 and swinging the same at a predetermined amplitude and causing the chip 11 to swing at a predetermined amplitude to supply the strand 5 to a winding tube while traversing the strand 5. Furthermore, the traversing device 7 has a function to move while maintaining the distance from the surface of the square-end cheese package 10 at a constant distance as the outer diameter of the square-end cheese package 10 is enlarged with proceeding of the winding operation. The winding collet 8 has a function for controlling the rotational speed thereof so as to prevent change in the package peripheral speed, that is, change of the speed at which the strand 5 is wound, even when the outer diameter of the square-end cheese package 10 is enlarged with proceeding of the winding operation.

Figure 4A:
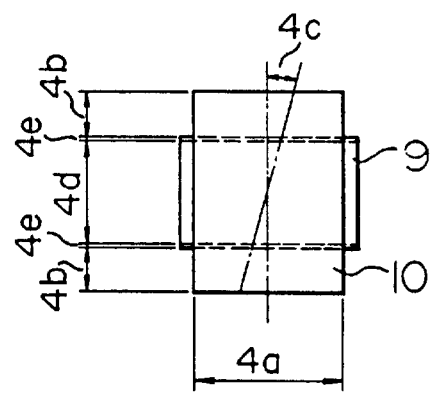
FIG. 4A is a front elevational view which illustrates a square-end cheese package.
Figure 4B:
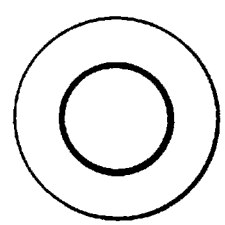
FIG. 4B is a side elevational view which illustrates the square-end cheese package shown in FIG. 4A.
Figure 5:
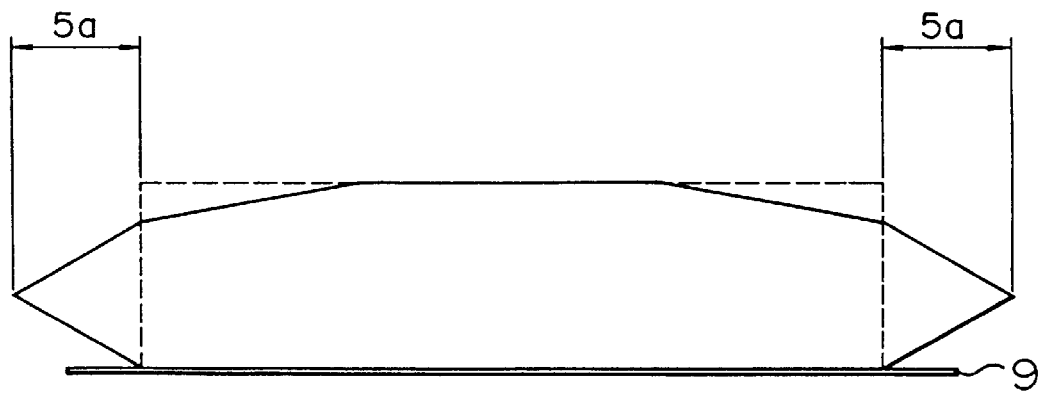
FIG. 5 is a cross sectional view which illustrates a half portion of a square-end cheese package having two ends deformed.

FIGS. 4A and 4B illustrate a product formed by winding the square-end cheese package 10 around the tube 9 while preventing deformation. Referring to FIG. 4A, reference numeral 4a represents the width of winding, 4b represents the thickness of winding, 4c represents a traversing angle of the wound strand, 4d represents the diameter of the winding collet 8, and 4e represents the thickness of the winding tube 9. FIG. 5 illustrates an example of a state where the square-end cheese package is deformed by an excessively large tension of the strand, FIG. 5 being a cross sectional view (one side is shown) which illustrates the square-end cheese package wound around the winding tube 9. Referring to FIG. 5, dashed lines show the cross sectional view of the package which is not deformed. Reference numeral 5a represents the width of deformation.

A result of an experiment is shown in Table 1. The experiment was carried out to examine the deformation of the package when square-end cheese packages were formed by using two types of strands and two traversing angles while changing the tension of the strand. The experiment conditions were as follows: winding width 4a was 200 mm; winding thickness 4b was 20 mm; two traversing angels 4c were 3.07° and 4.45°; winding collet diameter 4d and 150 mm; winding tube thickness 4e was 0.5 mm; strand winding speed was 3000 m/min; two types of strands either of which was 33.7 tex strand composed of 400 filaments (filament diameter: 6.5μ) and another strand of 33.7 tex composed of 600 filaments (the filament diameter: 5.3μ) were used. Results of the experiment are shown in Table 1.

TABLE 1

| Size of strand | 33.7 tex | 33.7 tex | 33.7 tex | 33.7 tex |
|---|---|---|---|---|
| Number of filaments | 600 | 600 | 400 | 400 |
| Size of filament | 5.3μ | 5.3μ | 6.5μ | 6.5μ |
| Traversing angle | 4.45° | 3.07° | 4.45° | 3.07° |
| Tension (gf) | Width of deformation (5a m) when stand was wound with no tension relaxing device used | | | |
| 332 | 26.7 | winding impossible | | |
| 201 | | | 12.5 | 23.0 |
| | Width of deformation (5a mm) when tension was reduced by using the tension relaxing device | | | |
| 300 | 23.6 | 38.2 | — | — |
| 250 | 19.1 | 33.6 | — | — |
| 200 | 13.6 | 24.1 | — | — |
| 150 | 8.2 | 12.6 | 7.2 | 11.9 |
| 125 | 5.2 | 7.8 | 5.4 | 7.6 |
| 100 | 2.8 | 5.2 | 2.5 | 5.5 |
| 75 | 0 | 2.2 | 0.2 | 2.0 |
| 50 | 0 | 0 | 0 | |

Figure 6:
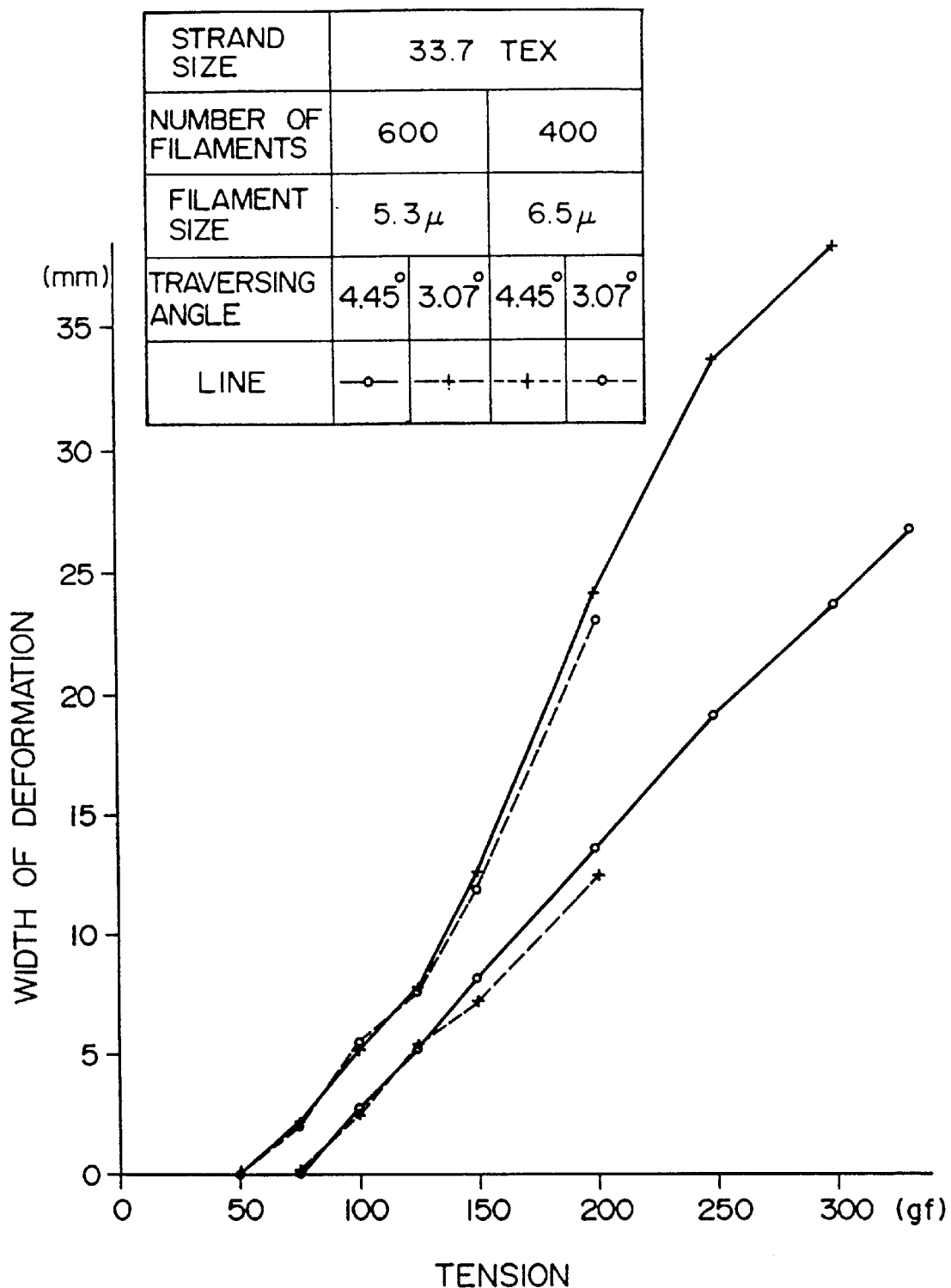
FIG. 6 is a graph which illustrates the relationship between tension acting on a strand and the width of deformation of the package in a case where a square-end cheese package is formed.

Results of Table 1 are shown in in FIG. 6

As can be seen from Table 1, the four strands have the same size of 33.7 tex, while having different number of filaments thereof as 600 and 400, varying by 1.5 times. As a result, the tensions generated were 332 g and 201 g. Thus, it can be understood that the thin filament has a larger tension.

As shown in FIG. 6, if the strand is wound while reducing the tension generated on the strand by the tension relaxing device, the width of the deformation of the package can be reduced. Furthermore, the gradient varies depending upon the traversing angle at which the strand is wound, the traversing angel being 4.45° and 3.07°. If the strands wound at the same traversing angles and having the same size are used, the same results are obtained regardless of the tension of the strands. Although the width of the deformation of the packages is changed considerably due to a slight change of the traversing angle if the tension is large, the same is not changed considerably if the tension is small.

The degree of the deformation of the square-end cheese package depends upon the traversing angle and tension/strand size. Therefore, the degree of the deformation is the same if the size of the strand is doubled and the tension is also doubled in the case where the traversing angle is the same. The aforesaid fact was also confirmed by the experiment.

In the glass fiber, the tension per strand size is rapidly enlarged in inverse proportion of the size of the filament. The aforesaid fact causes the glass fiber to encounter the difficulty that the glass yarn having a diameter of 9μ or less cannot easily be wound to form a square-end cheese package. However, the arrangement of the present invention that the large tension generated in the strand is considerably reduced by the tension relaxing device, followed by winding enables a strand to be wound to form a square-end cheese package regardless of the tension of the strand.

The conventional method has an arrangement that the glass strand is temporarily wound to form a so-called cake and the cake is rewound to a bobbin to manufacture a product. However, the present invention enables the square-end cheese package to be a product by forming the square-end cheese package in the process in which the cake is manufactured according to the conventional technology. Furthermore, the following process in which rewinding to a bobbin is performed can be completely omitted. As a result, the cost can be significantly reduced. Therefore, the following problems can be overcome: the problem of deterioration of the quality due to the fact that the strand is rubbed and the problem of the unsatisfactory yield due to cutting of the strand each of which takes place in the process in which the strand is rewound to a bobbin.

The conventional technology in which the cake is formed encounters a problem that the change in the size of the strand becomes excessively with proceeding of the winding operation. Furthermore, the tension generated in the strand is enlarged in inverse proportion to the size of the glass filament, causing the strand wound in the lower layer to be pressed if a large cake is formed. As a result, the quality deteriorates excessively and therefore a large cake cannot be formed. However, the present invention having the arrangement that the square-end cheese package having a flat surface is formed by winding the strand enables the change in the size of the strand to be eliminated. Furthermore, the tension relaxing device considerably reduces the tension of the strand. Therefore, a large package formed by winding a strand by a large quantity can be formed.

What is claimed is:

1. A method of manufacturing a glass yarn in a non-twisted state comprising the steps of:

forming a multiplicity of glass filaments a diameter of which is $9.5\mu$ or less by drawing molten glass flowing out through a multiplicity of orifices formed in a bottom portion of a bushing while applying a tension to said multiplicity of filaments;

forming a single strand of glass yarn having said tension by applying a sizing agent to said multiplicity of glass filaments and gathering said multiplicity of glass filaments by a gathering device;

reducing the tension of said strand; and winding said strand at a predetermined winding speed to form one square-end package of said glass yarn;

wherein said strand tension reducing step is effected throughout said winding step, said strand tension reducing step including bringing said strand into contact with a peripheral surface of each of three positively driven drums, said three drums each being rotated at a peripheral speed that is faster than said winding speed, said three positively driven drums are rotated simultaneously and are disposed in closely spaced fashion, an uppermost drum and a lowermost drum of said three drums being disposed at fixed positions and a middle drum of said three drums being movable transversely with respect to the uppermost and lowermost drums so as to adjust the tension of said strand, and said uppermost drum and said lowermost drum are rotated in the same direction, said middle drum being rotated in an opposite direction with respect to the direction of rotation of said uppermost and lowermost drums.

2. A method of manufacturing a glass yarn according to claim 1, wherein each of said multiplicity of glass filaments is formed by drawing molten glass.

3. A method of manufacturing a glass yarn according to claim 2, wherein said winding step is performed in such a manner that said strand is wound around one winding tube fastened to a collet while being traversed by one traversing device, said traversing device reciprocating with respect to said tube.

4. A method of manufacturing a glass yarn according to claim 1, wherein after the reducing step, the tension (gf) of said one strand is reduced to strand size (tex)×150/33.7 or less.

5. A method of manufacturing a glass yarn according to claim 1, wherein said winding step is performed in such a manner that said strand is wound around one winding tube fastened to a collet while being traversed by one traversing device, said traversing device reciprocating with respect to said tube.

* * * * *